(12) United States Patent
Leitl

(10) Patent No.: US 6,834,765 B1
(45) Date of Patent: Dec. 28, 2004

(54) SERIES INSTALLATION DEVICE ARRANGEMENT

(75) Inventor: Wolfgang Leitl, Wenzenbach (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 09/958,178

(22) PCT Filed: Mar. 24, 2000

(86) PCT No.: PCT/DE00/00905

§ 371 (c)(1),
(2), (4) Date: Oct. 5, 2001

(87) PCT Pub. No.: WO00/60712

PCT Pub. Date: Oct. 12, 2000

(30) Foreign Application Priority Data

Apr. 6, 1999 (DE) .......................................... 199 15 375

(51) Int. Cl.[7] ................................................. A47F 7/00
(52) U.S. Cl. ........................................ 211/26; 361/809
(58) Field of Search ........................ 211/26, 162, 94.01, 211/41.17, 59.4, 169.1, 170; 403/363, 326; 312/223.1, 223.2; 248/674, 680, 27.1, 27.3, 222.51; 361/679, 683, 724, 748, 784, 788, 803, 804, 802, 758, 807, 809, 810, 825

(56) References Cited

U.S. PATENT DOCUMENTS

| | | | | |
|---|---|---|---|---|
| 4,672,511 A | * | 6/1987 | Meusel et al. .............. | 361/802 |
| 5,283,713 A | * | 2/1994 | Nagafuji et al. ............ | 361/796 |
| 5,392,196 A | * | 2/1995 | Kinner ........................ | 361/809 |
| 5,404,275 A | * | 4/1995 | Zenitani et al. ............. | 361/802 |
| 5,907,476 A | * | 5/1999 | Davidsz ...................... | 361/732 |
| 6,064,574 A | * | 5/2000 | Yu et al. ..................... | 361/704 |
| 6,115,258 A | * | 9/2000 | Hoyle et al. ................ | 361/752 |
| 6,158,594 A | * | 12/2000 | Boe ........................ | 211/41.17 |
| 6,208,514 B1 | * | 3/2001 | Stark et al. ................. | 361/704 |
| 6,208,523 B1 | * | 3/2001 | Bertolami et al. .......... | 361/759 |
| 6,288,902 B1 | * | 9/2001 | Kim et al. ................... | 361/725 |
| 6,381,148 B1 | * | 4/2002 | Daskalakis et al. ......... | 361/801 |
| 6,407,926 B1 | * | 6/2002 | Walker et al. .............. | 361/752 |
| 6,411,517 B1 | * | 6/2002 | Babin ......................... | 361/759 |
| 6,456,495 B1 | * | 9/2002 | Wieloch et al. ............. | 361/729 |
| 6,533,131 B2 | * | 3/2003 | Bada ......................... | 211/59.2 |

FOREIGN PATENT DOCUMENTS

| | | |
|---|---|---|
| DE | 3710708 A1 * | 10/1988 |
| DE | A1 42 10 556 | 10/1993 |
| DE | U1 297 10 310 | 10/1997 |
| EP | A2 0 327 708 | 8/1989 |

* cited by examiner

Primary Examiner—Carl D. Friedman
Assistant Examiner—Jennifer E. Novosad
(74) Attorney, Agent, or Firm—Harness Dickey

(57) ABSTRACT

A device arrangement includes a number of series installation devices which can be snapped onto a mounting rail by way of a snap-action slide interacting with a slide actuator. It further includes the synchronous actuation of a plurality of snap-action slides, a comb-like coupling part which is connected in captive fashion to the slide actuator. Such parts are to be coupled and include a coupling web which runs transversely to a number of joining arms and connects the latter.

23 Claims, 11 Drawing Sheets

SERIES INSTALLATION DEVICE ARRANGEMENT

This application is the national phase under 35 U.S.C. § 371 of PCT International Application No. PCT/DE00/00905 which has an International filing date of Mar. 24, 2000, which designated the United States of America, the entire contents of which are hereby incorporated by reference.

FIELD OF THE INVENTION

The invention relates to a device arrangement with a number of series installation devices which can be snapped onto a mounting rail. In each case, they are preferably snapped by way of a snap-action slide interacting with a slide actuator. Preferably, it is possible, for the synchronous actuation of a plurality of snap-action slides, for the slide actuator of the latter to be coupled to one another.

BACKGROUND OF THE INVENTION

A device referred to as a series installation device is usually one which has one or more poles and can be snapped onto a mounting or DIN rail. In order to fasten such a series installation device, e.g. a circuit-breaker or a similar switching or control device, on the standardized mounting or DIN rail, one or more snap-action slides are usually provided. Each of these slides, in the retaining connection between the device and the mounting rail, engages behind a mounting-rail border.

In order to release this retaining connection, DE 297 103 10 U1 discloses the practice of coupling the snap-action slide to a release lever in the manner of a toggle link. Upon actuation, forces are deflected, via the release lever serving as slide actuator, to the snap-action slide interacting therewith. The slide actuator here is expediently of web-like design, the webs being spaced-apart and parallel sidepieces which are integrally formed on a handgrip of the slide actuator. The slide actuator formed in this way thus leaves free between the webs or sidepieces, a sufficiently wide connection space for a terminal connection.

In the case of the known configuration of the slide actuator, connecting elements in the manner of a groove and tongue contour are provided in order to allow coupling of the slide actuator located one beside the other in multi-pole devices. As a result, the snap-action slides in multi-pole devices can be actuated synchronously by a single manipulation. It is only possible for single devices to be displaced on the mounting rail, aligned thereon or released therefrom by way of the slide arrangement when they are arranged separately or at a minimum distance from adjacent devices. In the case of single-pole devices, the laterally projecting tongues of the slide actuator are thus cut off. Analogously, in the case of multi-pole devices, the tongues of the slide actuator are thus cut off. Analogously, in the case of multi-pole devices, the tongues of the slide actuator of the two outer devices are removed. However, on account of the additionally necessary operating step, this is extremely undesirable.

SUMMARY OF THE INVENTION

The object of the invention is thus to specify a device arrangement of the type of which the slide actuator, in particular in the case of a series installation device of two, three or four poles, can be actuated synchronously in a particularly straightforward and reliable manner.

This and/or other objects are achieved according to the invention by the features of claim 1. For this purpose, there is provided a separate coupling part which is connected in captive fashion to the slide actuator which are to be coupled and are thus to be actuated synchronously. The coupling part here is of comb-like design and has a coupling web which runs transversely to the number of joining arms and connects the latter.

The provision of such a separate coupling part also makes it possible for the slide actuator of series installation devices with two, three, four or more poles to be coupled subsequently. The respective slide actuator may thus be coupled when the corresponding devices have already been snapped onto the mounting rail. It is preferable, however, for the corresponding devices to be synchronized already, in terms of their slide actuator, at the factory in a preliminary assembly step by way of the coupling part. As a result, the device arrangement or device group as a whole can be positioned on the mounting rail on site. Otherwise, i.e. with the devices uncoupled, it is also possible for the slide actuator of the latter to be actuated individually when the devices are arranged directly one beside the other, and thus with virtually no distance between them.

The connection between the coupling part and the slide actuator may be a releasable connection, e.g. a screw-connection or a clip connection. It is advantageous, however, to provide a non-releasable joining connection between the coupling part and the slide actuator which are to be coupled. The joining connection here is expediently a combined plug-in and snap-action connection.

For this purpose, an advantageous configuration provides, in respect of the joining arm, a plug-in connection with the respective slide actuator and, in respect of the coupling web connecting the joining arms, a snap-action connection in the manner of a catch mechanism with the slide actuator which are to be coupled. For this purpose, on the one hand, there is advantageously provided on the coupling web a number of snap-action elements, which, in the joining connection, engage behind blocking contours provided on the slide actuator. This corresponds to the number of slide actuators which are to be coupled. On the other hand, the slide actuators have an abutment contour which is designed to complement a supporting contour provided on the joining arm. In the joining connection, each joining arm, which is supported on the abutment contour via its supporting contour, is then fixed in position in the respective plug-in connection with the slide actuator. This realizes a reliable and thus secure joining connection between the coupling part and the slide actuators which are to be coupled.

Those contours on the joining arms of the coupling part, on the one hand, and on the corresponding slide actuator, on the other hand, which butt against one another in the plug-in connection are expediently designed as centering contours. For this purpose, the contours are advantageously configured in the form of a wedge or of a V with a centering angle being formed in the process. In this case, the centering angle of the abutment contour of the slide actuators is greater than the centering angle of the supporting contour of the respective joining arm.

The slide actuator, which are expediently configured in the same way for all the series installation devices, can also be actuated individually, and thus independently of one another, if a plurality of devices are lined up in a row directly one beside the other, with no distance between them. It is thus possible for each series installation device designed in this way to be used equally as a single-pole device and within a multi-pole device arrangement.

It is advantageous for the slide actuator of each series installation device to be closed, in the initial state, by way of a membrane in the region of the plug-in connection of the coupling part, above a corresponding joining space. The membrane is configured as an injection-molded skin if a slide actuator includes plastic. In order to produce the joining connection, the membrane is cut or pierced, in a first joining step, by way of the joining arms of the coupling part, for which purpose each joining arm is advantageously provided with an integrally formed, blade-like cutting-edge contour at the free end. In this case, the cutting-edge contour, which runs transversely to the longitudinal direction of the joining arm and is expediently formed by two cutting arms, projects beyond the V-shaped supporting contour of the joining arms.

In order to fix the joining arms in position in the plug-in connection, each joining arm has an integrally formed portion in the form of a transverse web which is integrally formed on the joining arm, in the region between the cutting arms, at the free end on that side of the joining arm which is directed away from the supporting contour. In the joining connection, the transverse web of the joining arm engages behind a stop, provided on the slide actuator, in the manner of an undercut.

In order to ensure play-free synchronous movement of the coupled slide actuator, and thus of the multi-pole snap-action slides, the coupling part has at least one clamping nose.

By way of the or each clamping nose, in the joining connection, the coupling part is prestressed in relation to the slide actuator in the longitudinal direction of the joining arm and/or transversely thereto. The play which is necessary for latching the snap-action element and for producing the joining connection is achieved here in that the corresponding blocking contour of the slide actuator is configured in a deformable manner. Thus, as force is exerted via the coupling part, it can move away from the corresponding snap-action element, expediently designed as a snap-action hook, with elastic spring-back action.

For handling purposes during the synchronous actuation of the snap-action slides, the coupling part expediently has a trough-like finger hollow, preferably provided with corrugations, as a handgrip. As a result, all the snap-action slides of the device arrangement, which are coupled to the slide actuator, can easily be moved by hand by way of the coupling part. It is further possible, if appropriate, for a tool, for example a screwdriver, to be positioned on the handgrip.

The advantages achieved by the invention reside, in particular, in that, by the provision of a separate coupling part, it is possible for the slide actuator of a device arrangement with a corresponding number of series installation devices to be coupled to one another in a particularly straightforward manner. Thus, snap-action slides interacting with the slide actuator can be actuated synchronously. On the other hand, it is also possible for said slide actuator to be provided in single-pole devices. It is thus possible for the series installation devices configured with such a slide actuator, with a simultaneously small storage supply being required, during the production of the devices, both individually and—with the use of further individual or additional parts necessary for multi-pole devices—in a multi-pole device arrangement.

Furthermore, even with a plurality of series installation devices in closely packed distribution, the coupling part is always accessible in a particularly straightforward manner since the handling points are located on the front accessible region of the series installation devices. The joining connection, which is advantageously play-free in relation to the slide actuator as a result of the prestressing of the coupling part, avoids, in practice, any displacement loss of the slide actuator by deformation of the coupling part. This may be influenced particularly advantageously in that the coupling part has a flexorally rigid cross section and includes, for example, a material with a high glass-fill content. A glass-fiber-reinforced plastic with a glass-fiber content of preferably 50% is particularly suitable for this purpose.

On the one hand the active surfaces of the snap-action connection, which butt against one another in the joining connection of the coupling part with the slide actuator and, on the other hand, the supporting contours in the plug-in connection, which are expediently designed as centering surfaces, allow force to be introduced specifically to the individual slide actuator both during release, and thus unlocking, of the snap-action slides interacting therewith and during locking of the same on the mounting rail. In the joining connection with the slide actuator, the coupling part allows particularly smooth actuation, which is easy to realize using the fingers and thus without any tools, of the snap-action slides. The smoothness of the opening and closing movements is ensured by avoiding additional friction in the guidance of the slide actuator, as a result of symmetrical force introduction.

On account of the expediently non-releasable joining connection, which is realized, on the one hand, by a positionally fixed plug-in connection with undercut, and on the other hand, by a snap-action connection, undesired dismantling is reliably avoided. The joining connection can thus be produced straightforwardly without any waste and without any additional tools being used. The corresponding operation of installing the coupling part on the multi-pole devices can also be automated.

The joining connection can be realized in a manner which is straightforward in terms of design and assembly, and is thus cost-effective, by the coupling part being plugged and then snapped into the slide actuator, since preliminary punching of the slide actuator is dispensed with on account of the cutting-edge surfaces or contours integrally formed on the joining arms of the coupling part. Since the opening for the plug-in connection of the coupling part is only produced during the assembly operation by virtue of membranes provided on the slide actuator being severed, the opening is always closed in the case of a single-pole device, with the result that dirt cannot penetrate into the device.

BRIEF DESCRIPTION OF THE DRAWINGS

Exemplary embodiments of the invention are explained in more detail hereinbelow, with reference to a drawing, in which.

Parts which correspond to one another are provided with the same designations in all the figures.

DETAILED DESCRIPTION OF THE PREFERRED EMBODIMENTS

Figure 1:
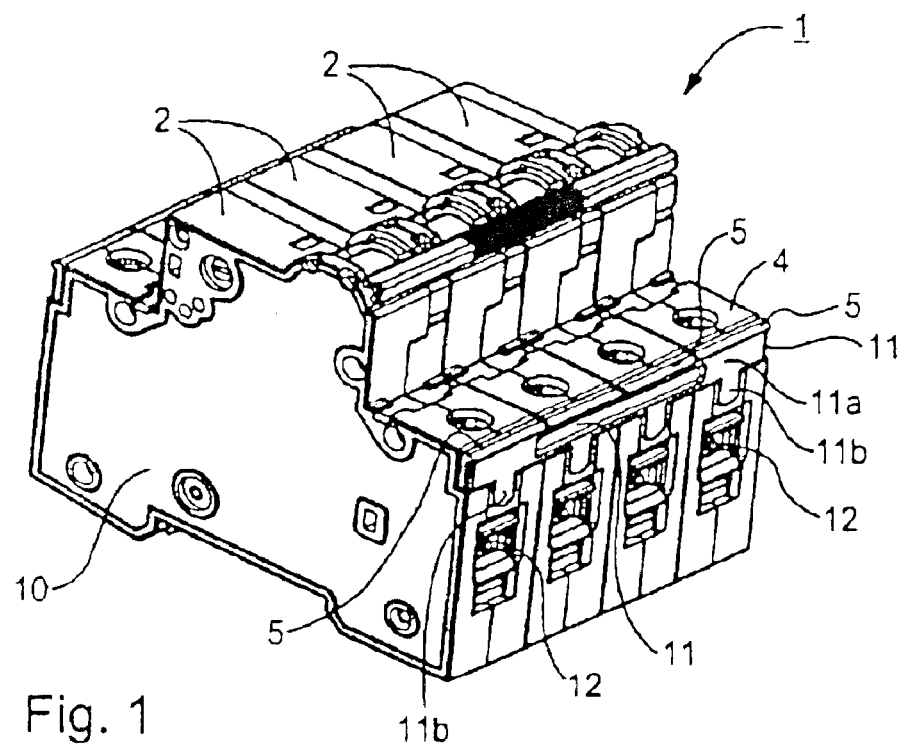
FIG. 1 shows a perspective illustration of a multi-pole device arrangement with four series installation devices with slide actuator, which can be operated synchronously via a coupling part, in the closed position.
Figure 2:
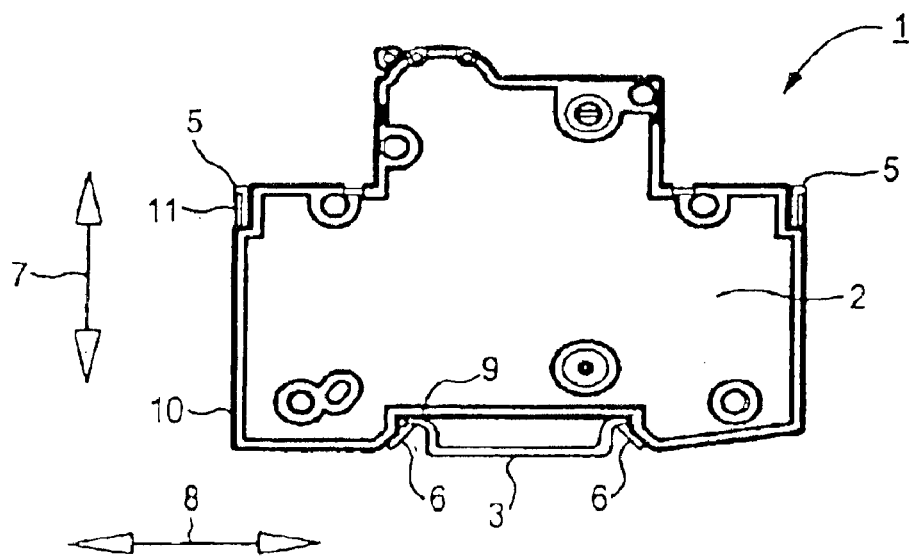
FIG. 2 shows a side view of the device arrangement according to FIG. 1 snapped onto a mounting rail.
Figure 3:
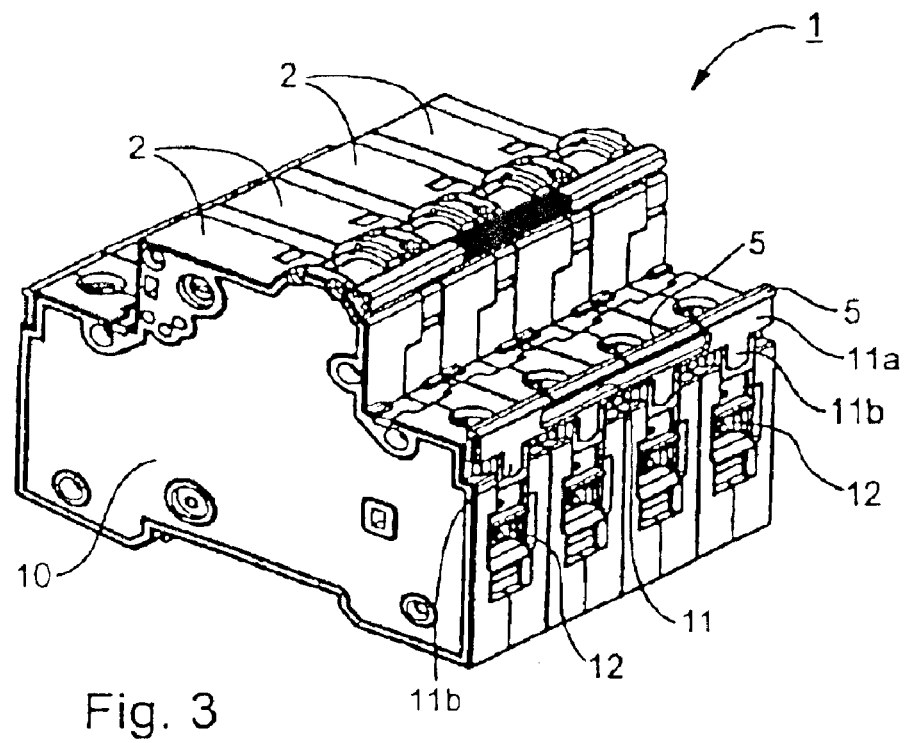
FIG. 3 shows, in an illustration according to FIG. 1, the device arrangement with the coupled slide actuator in the open position.

FIGS. 1 to 4 show a four-pole device arrangement 1 as an example of a multi-pole arrangement, with four series installation devices 2 which are lined up in a row one beside the other and may be positioned jointly on a mounting rail 3. Each series installation device 2 has, on both sides, a slide actuator 5 which can be operated from the top side 4 of the device and interacts in each case with a snap-action slide 6 (FIG. 2).

Figure 4:
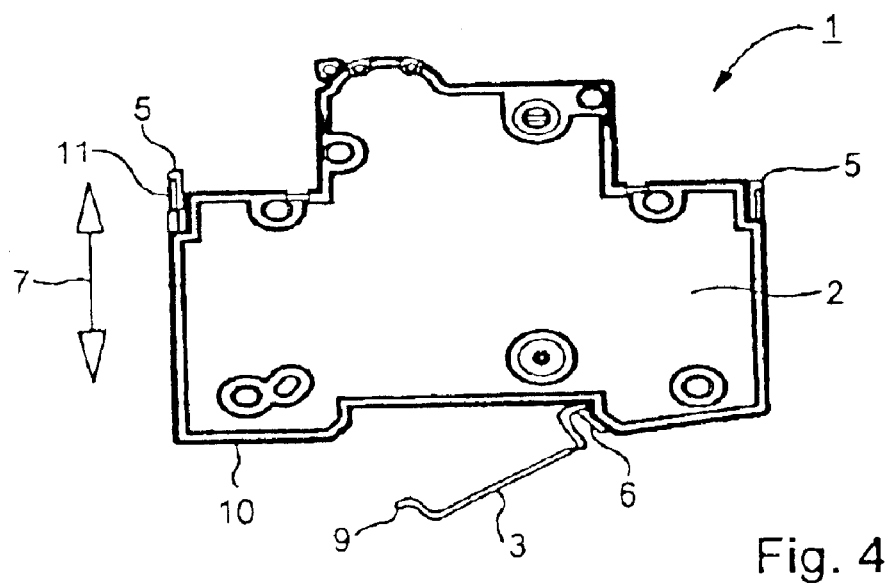
FIG. 4 shows, in an illustration according to FIG. 2, the device arrangement released from the mounting rail on one side.
Figure 5A:
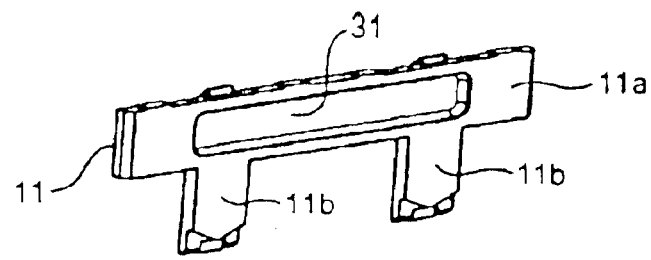
FIGS. 5a to 5c show a perspective illustration of a coupling part for a device arrangement which has two, three and four poles, respectively, and a number of joining arms, integrally formed on a coupling web, which corresponds to the number of poles.
Figure 5B:
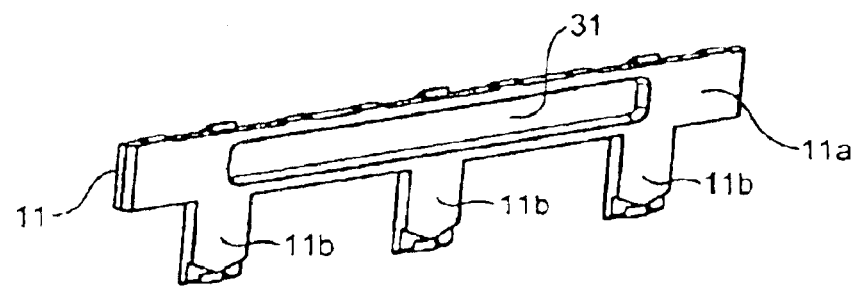
Figure 5C:
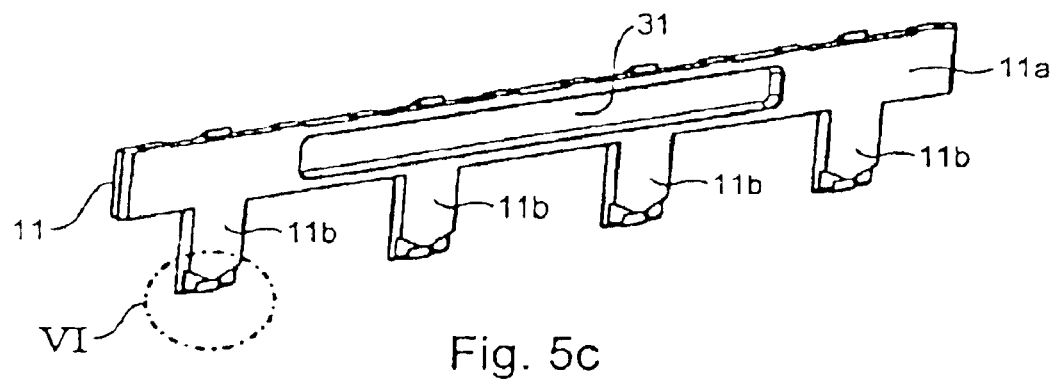

The coupling of each slide actuator 5 of the respective series installation device 2 to the associated snap-action slide 6 is preferably realized in the manner of a toggle-link coupling, as is illustrated and described in German Utility Model DE 297 10 310 U1. The coupling here is realized such that by displacement of the slide actuator 5 in the actuating direction 7. As a result of the force deflection, a slide movement of the snap-action slide 6 running in the direction 8 transverse to the actuating direction 7 takes place. In the locked state according to FIG. 2, the snap-action slide 6 engages behind a border 9 of the mounting rail 3. In the open position of the or each slide actuator 5, the open position being illustrated in FIGS. 3 and 4 and being brought about by the slide actuator 5 being pulled, in actuating direction 7, towards the top side 4, the corresponding snap-action slide 6 slides into the housing 10 of the series installation device 2, with the result that the rear engagement of the mounting-rail border 9 is released and it is also possible for an individual series installation device 2 to be displaced on the mounting rail 2 or raised off therefrom (FIG. 4).

For the synchronous actuation of all the slide actuator 5, the latter are connected to one another via a coupling part 11. In this case, the coupling part 11 is of comb-like configuration—as is illustrated in FIG. 5a to 5c and 7. It has joining arms 11b which are integrally formed on a coupling web 11a and the number of which corresponds to the number of slide actuator 5 which are to be coupled. In order to couple two slide actuators 5 of a two-pole device arrangement 1, the coupling part 11 thus has, according to FIG. 5a, two spaced-apart joining arms 11b which, in the installed or joined state, run in the actuating direction 7. In the case of a three-pole or four-pole device arrangement 1, a coupling part 11 respectively having three or four joining arms 11b is correspondingly provided. The coupling part 11 is joined preferably non-releasably to the corresponding slide actuator 5. In the joining connection here, the joining arms 11b are located in each case above a terminal connection 12 of the respective series installation device 2, the terminal connection being left free by the corresponding slide actuator 5.

Figure 6:
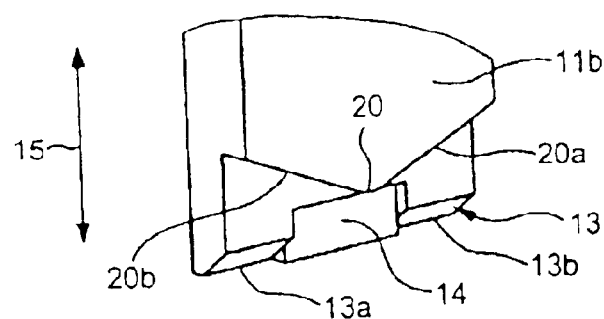
FIG. 6 shows a detail VI from FIG. 5c on an enlarged scale with a joining arm having a supporting contour and a cutting contour.
Figure 7:
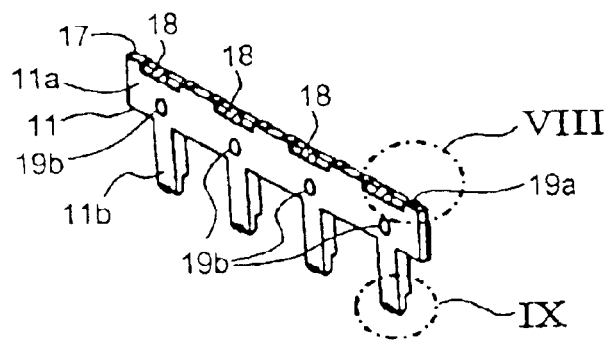
FIG. 7 shows a rear view of the coupling part according to FIG. 5c.
Figure 9:
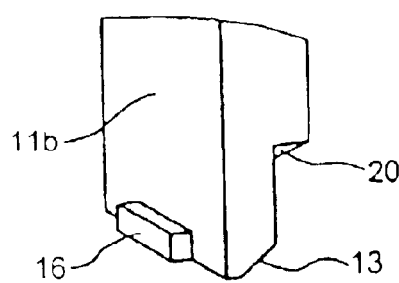
FIG. 9 shows a further detail IX from FIG. 7 on an enlarged scale with a transverse web integrally formed on the joining arm.

As can be seen comparatively clearly from FIG. 6, each joining arm 11b is provided with a cutting-edge contour 13 at the end on one side. The cutting-edge contour 13 is formed by two cutting-edge arms 13a and 13b which are of blade-like form at the free end in each case and between which an undercut contour 14 is provided. The undercut contour 14, which is flanked on both sides by the cutting-edge arms 13a and 13b of the cutting-edge contour 13 which runs transversely to the actuating direction 7, and thus transversely to the longitudinal direction 15 of the joining arm 11b, has a transverse web 16 which is integrally formed on the rear side thereof, as can be seen from FIGS. 7 and 9.

Figure 8:
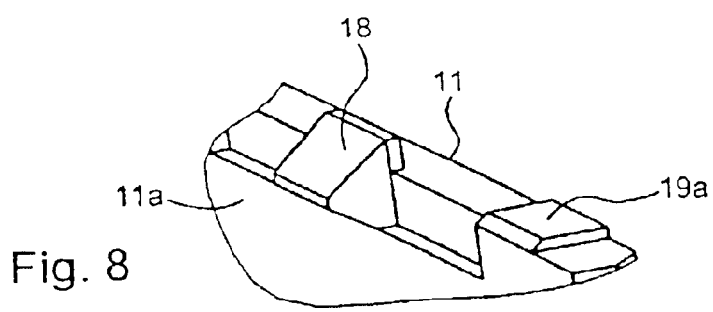
FIG. 8 shows a detail VIII from FIG. 7 on an enlarged scale with clamping noses and snap-action hooks integrally formed on the coupling web.
Figure 11:
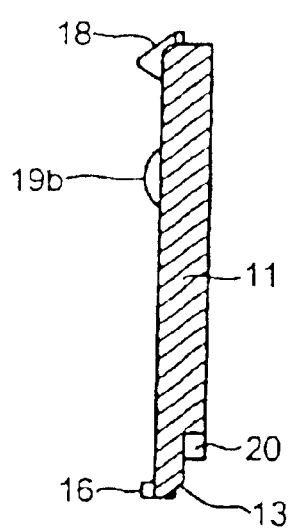
FIG. 11 shows a sectional illustration of the coupling part along line XI—XI in FIG. 10.
Figure 12:
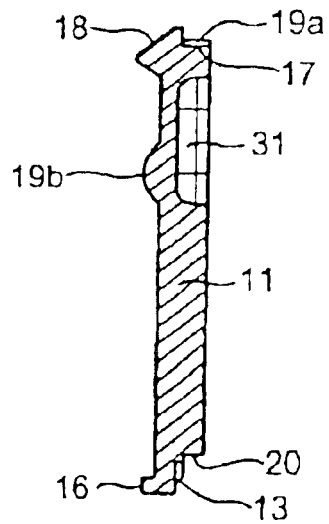
FIG. 12 shows another sectional illustration of the coupling part along line XII—XII in FIG. 10.

Integrally formed on the coupling web 11a, on the top edge 17 of the coupling part 11, the top edge being located opposite the cutting-edge contours 13, is a number of snap-action elements or snap-action hooks 18 which corresponds to the number of slide actuator 5 which are to be coupled. As can be seen comparatively clearly from FIG. 8 and from FIGS. 11 and 12, each snap-action element 18 projects on the rear side beyond the coupling web 11a of the coupling part 11. On both sides of the snap-action element 18, clamping noses 19a are integrally formed on the coupling web 11a, the noses projecting beyond the top edge 17 of the coupling web 11a. This can be seen comparatively clearly from FIG. 8. In this case, the snap-action elements 18 project beyond the clamping noses 19a in turn, as can be seen from FIGS. 10 to 12: The coupling part 11 is provided on the rear side, preferably in the region of each joining arm 11b, with protuberance-like clamping noses 19b, which are likewise integrally formed on the coupling web 11a.

Figure 10:
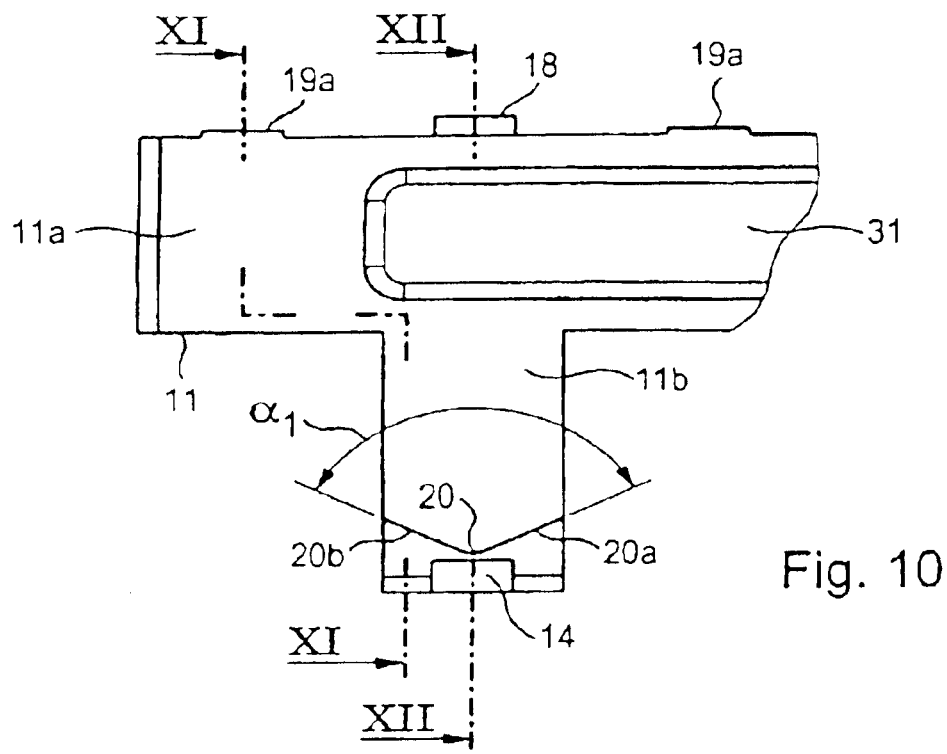
FIG. 10 shows, in detail form, a front view of the coupling part according to FIGS. 5 to 9 with a V-shaped supporting contour on the joining arm.

As can be seen particularly clearly from FIGS. 6 and 10, each joining arm 11b has a V-shaped supporting contour 20 which terminates above the coupling-edge contour 13 and of which the supporting legs 20a, 20b together enclose an angle $\alpha_1$. This centering angle $\alpha_1$ is preferably greater than 90°, e.g. 125°.

Figure 13:
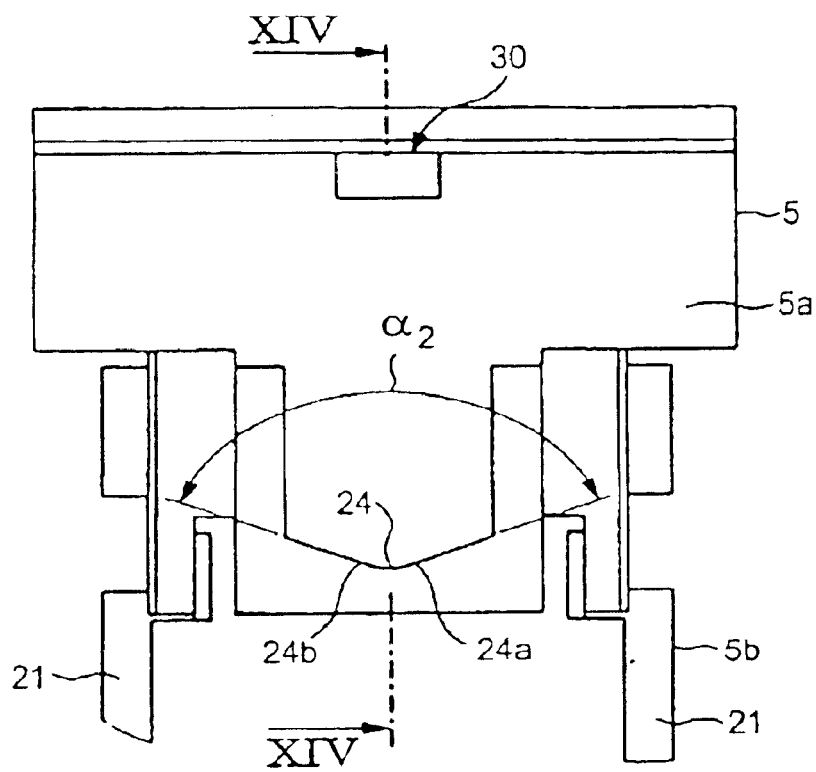
FIG. 13 shows, in detail form, a front view of a slide actuator.
Figure 14:
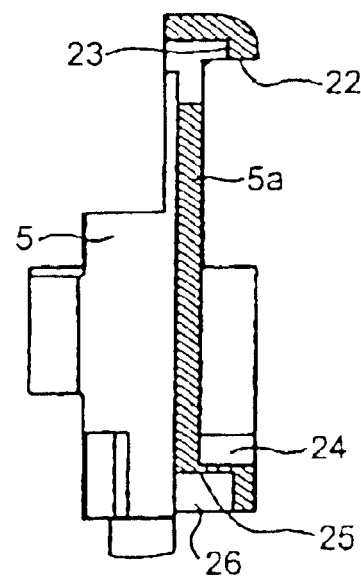
FIG. 14 shows the slide actuator in a sectional illustration along line XIV—XIV from FIG. 13.
Figure 15:
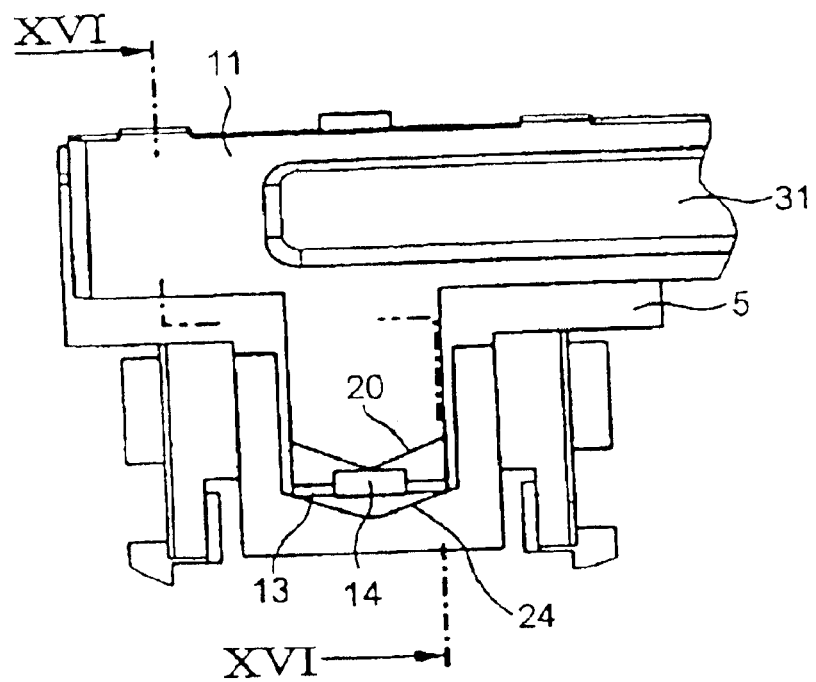
FIG. 15 shows a front view of the coupling part and the slide actuator in a first joining step.
Figure 16:
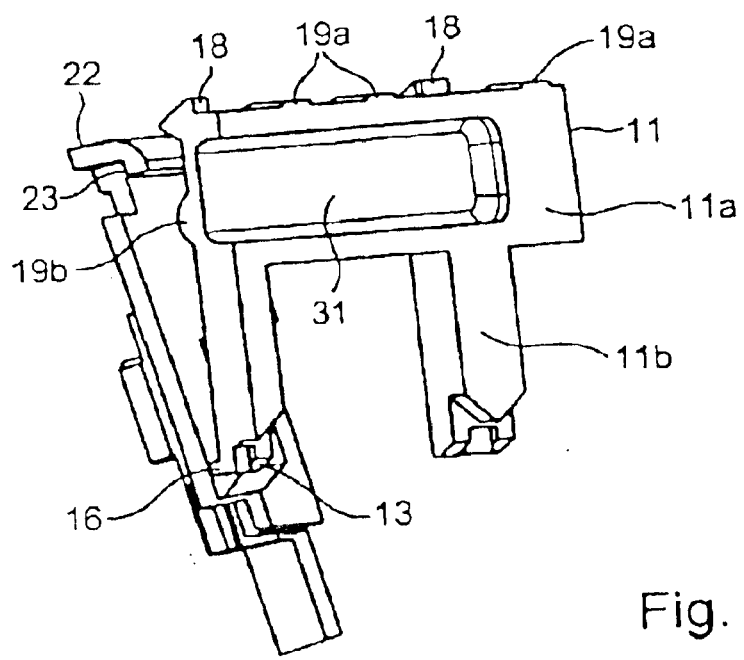
FIG. 16 shows the first joining step in a perspective sectional illustration along line XVI—XVI in FIG. 15.
Figure 17:
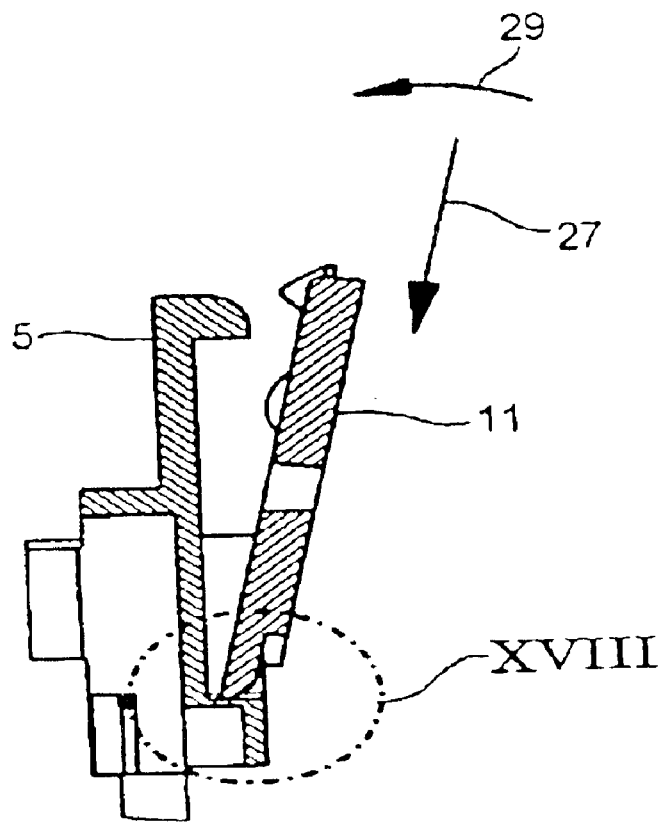
FIG. 17 shows the sectional illustration of the first joining step.

FIGS. 13 and 14 show the slide actuator 5, in detail form, in a front view and in longitudinal section, respectively. The slide actuator 5 has a top joining portion 5a and a bottom web or sliding portion 5b with two webs or sidepieces 21 which, in the installed state, flank the terminal connections 12 of the corresponding series installation device 2. The webs or sidepieces 21 are coupled to the respective snap-action slide 6 in the manner illustrated and operated in German Utility Model DE 297 10 310 U1.

The top joining portion 5a is designed in order to accommodate the corresponding portion of the coupling part 11 in a form-fitting manner. For this purpose, the joining portion 5a is adapted to the contour of the respective portion of the coupling web 11a and of the corresponding joining arm 11b. The slide actuator 5 is provided, at the top free end, with an L-shaped integrally formed portion which extends over its entire width and is in the form of a clip-like engagement portion 22 with a blocking contour 23 on the rear side. Provided opposite this is an abutment contour 24 which complements the supporting contour 20 of the joining arm 11b of the coupling part 11 and is likewise configured in the form of a V. In this case, the abutment legs 24a and 24b thereof, in turn, enclose an angle $\alpha_2 > 90°$.

The abutment contour 24 here is designed as a centering contour by the angle $\alpha_2$ being greater than the centering angle $\alpha_1$ of the supporting contour 20 of the joining arm 11b. In the region of the abutment contour 24, a severable membrane 25, which runs transversely to the actuating direction 7 and thus transversely to the longitudinal direction 15 of the joining arms 11b, is provided on the slide actuator 5. The membrane is configured as a thin injection-molded skin if a slide actuator 5 consists of plastic.

As can be seen from FIG. 14, said membrane 25 bounds, on the side located opposite the L-shaped engagement portion 22, an accommodating recess for the corresponding portion of the coupling part 11, the recess being open on both sides in the longitudinal direction 7 and 15. With the slide actuator 5 in a state in which it has not been coupled or joined, the membrane 25 closes a joining space 26 for the free end of the joining arm 11b of the coupling part 11, the joining space being located above the terminal-connection space bound by the webs 21.

In this state, the slide actuator 5, and the snap-action slide 6 coupled thereto, in each individual series installation device 2 and, in particular, in the case of a single-pole device 2 can be actuated via the clip-like engagement portion 22. The joining space 26 here is closed by way of a membrane 25. The result is that it is not possible for any dirt to pass to the terminal connection 12. Even if the devices 2 are lined up in a row one beside the other with no distance between them, it is possible for their slide actuator 5 to be operated without obstruction and for the snap-action slides 6 coupled thereto to be actuated.

Figure 18:
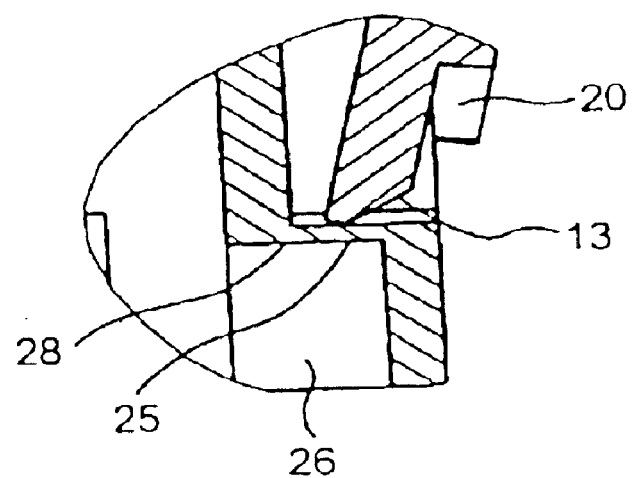
FIG. 18 shows a detail XVIII from FIG. 17 on an enlarged scale with the cutting-edge contour of the coupling part butting against a closed membrane of the slide actuator.
Figure 19:
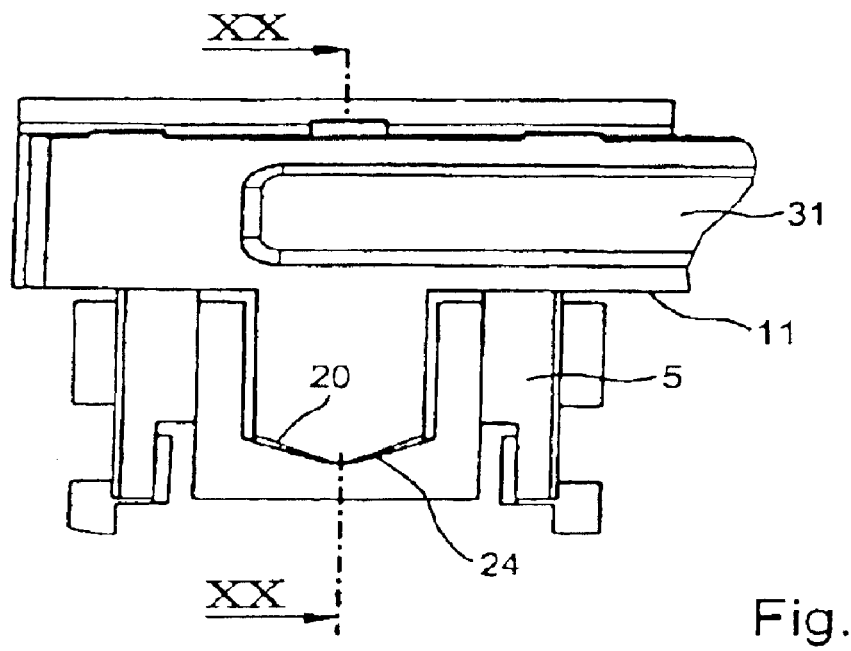
FIG. 19 shows, in an illustration according to FIG. 15, a coupling-part joining arm centered on the slide actuator.

FIGS. 15 to 18 show, in different illustrations, a first joining step for producing the joining connection between the coupling part 11 and the or each slide actuator 5 to be operated synchronously. In this case, first of all the coupling part 11 is positioned obliquely on the slide actuator 5 such that the respective cutting-edge contour 13 of the joining arm 11b butts against the corresponding membrane 25 (FIG. 18). By virtue of the coupling part 11 being moved in the joining direction 27 (FIG. 17), the membranes 25 are severed simultaneously in practice and the respective joining arm 11b penetrates into the joining space 26 by way of its transverse web 16.

Figure 20:
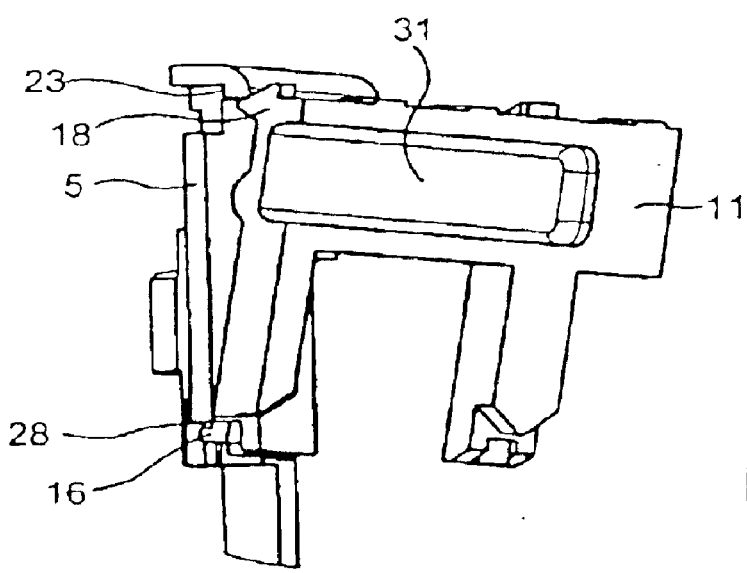
FIG. 20 shows, in a perspective sectional illustration along line XX—XX in FIG. 19, the centering and an undercut of the joining arm of the coupling part.
Figure 21:
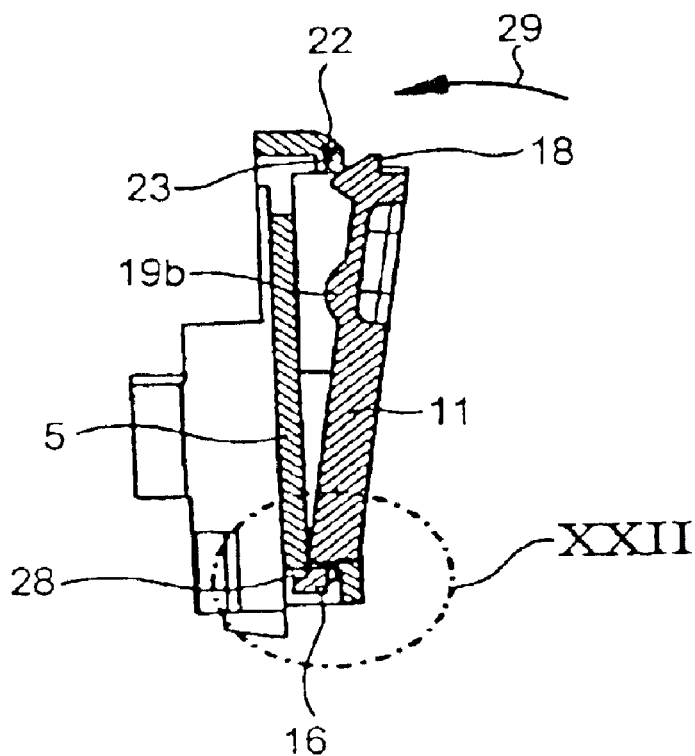
FIG. 21 shows the sectional illustration according to FIG. 20.
Figure 22:
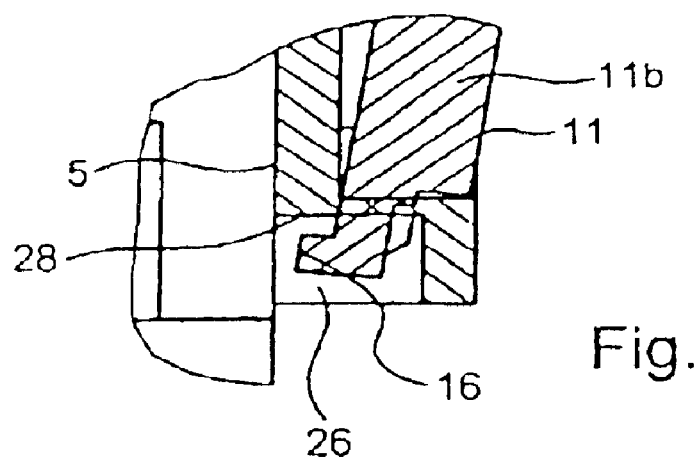
FIG. 22 shows, in a detail XXII from FIG. 21, on an enlarged scale, the undercut of the joining arm.
Figure 23:
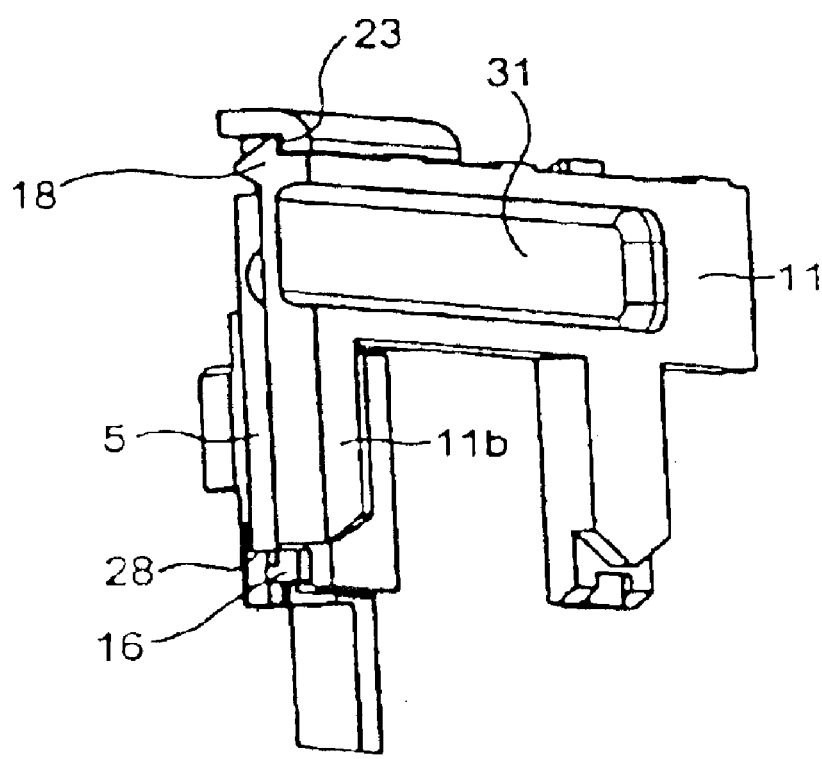
FIG. 23 shows, in a perspective sectional illustration according to FIGS. 16 and 20, following a second joining step, the joining connection between the coupling part and the slide actuator.
Figure 24:
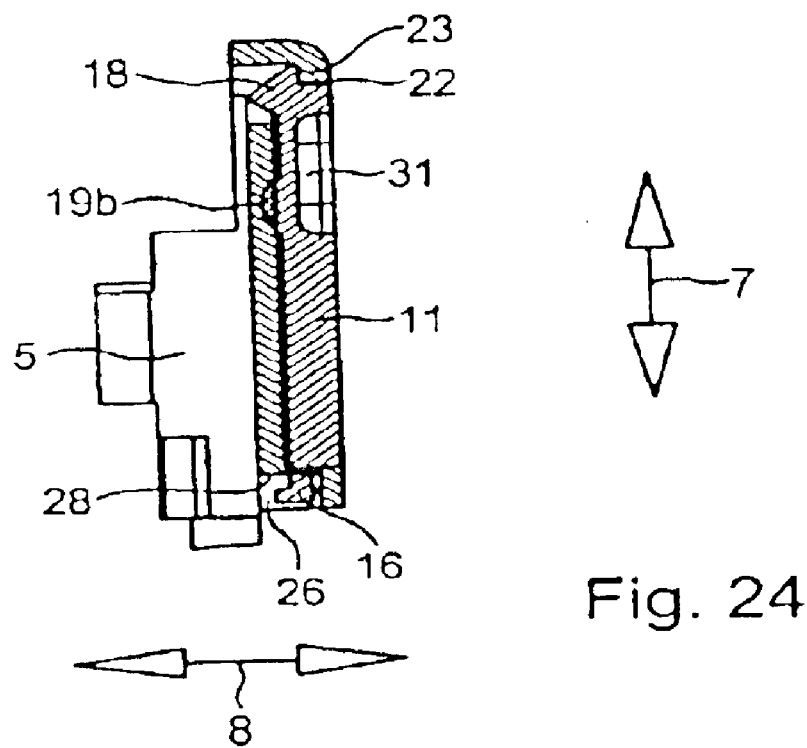
FIG. 24 shows a sectional illustration of the joining connection according to FIG. 23.

In this plug-in connection, the respective transverse web 16 engages behind a corresponding undercut or stop 28 in the region of the abutment contour 24 of the slide actuator 5. This can be seen from FIGS. 20 to 22. In the following, second joining step in the joining direction 29 (FIGS. 17 and 21), the coupling part 11, which has been plugged into the respective slide actuator 5 via the joining arms 11b, is latched to the slide actuator 5 by the snap-action element 18 on the top side 17 of the coupling web 11a engaging behind the blocking contour 23 of the respective slide actuator 5. The resulting joining connection between the coupling part 11 and the or each slide actuator 5 is illustrated in FIGS. 23 and 24.

A form-fitting joining connection, and thus play-free synchronous movement of the coupled slide actuator 5 and of the snap-action slides 6, interacting therewith, of the multi-pole device arrangement 1, is ensured here by the clamping noses 19a and 19b. The clamping noses 19a here prestress the coupling part 11 in the longitudinal direction 7, while the clamping noses 19b prestress the coupling part 11 in the transverse direction 8 within the joining connection with the slide actuator 5. This ensures play-free mounting of the coupling part 11 in the slide actuator 5. The clamping noses or integrally formed portions 19a and 19b thus ensure that the snap-action elements 18 and the blocking contours 23 remain pressed one upon the other in the joining connection of the coupling part 11 with the slide actuator 5. The play for latching the snap-action elements or snap-action hooks 18, and is necessary for assembly purposes, i.e. for producing the joining connection, is ensured via a deformation or recess 30 on the respective slide actuator 5 as a result of the action of force during the installation of the coupling part 11.

The clamping or over-dimensioned noses 19a, which are arranged symmetrically alongside the respective snap-action element 18, cause force to be introduced symmetrically into the webs or sidepieces 21 of the slide actuator 5. This may additionally be assisted in that the coupling part 11 is of particularly flexorally rigid configuration. The symmetrical introduction of force ensures a particularly high level of smoothness of the slide actuator 5 during the synchronous operation via the coupling part 11 since additional friction as a result of tilting of the slide actuator 5 in the guidance region is avoided.

For user-friendly actuation of the slide actuator 5, the coupling part 11, in the region of the coupling web 11a, has a trough-like or hollow-like finger hollow 31, running in the transverse direction 8, as a handgrip, which may be corrugated in addition. As a result, all the synchronously operated slide actuator 5 of the device arrangement 1 can be moved smoothly by hand via the coupling part 11. It is also possible, if appropriate, for a tool, for example a screwdriver, to be positioned, if appropriate, on the handgrip 31.

The production equipment which is necessary for producing the slide actuator 5, for example the injection mould which is provided for this purpose, may be configured without an additional slide (open-close mould) in the region of the membrane 25, in order to produce the opening for the coupling part 11. As a result, on account of the membrane 25 being present, the injection mould does not contain any difficult-to-coordinate marking locations in order to produce the opening for the coupling part 11. This is a considerable advantage particularly in the case of large-scale production with multi-cavity moulds. Thus, in addition to the moulds being subjected to only a low level of wear, high efficiency of the moulds is ensured since no additional moving parts and mould halves only have to be coordinated to a small extent. Furthermore, a trouble-free production procedure is ensured on account of moulds not being particularly susceptible to disruption.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device arrangement comprising:
   a plurality of series installation devices, each installation device having a snap-action slide interacting with corresponding slide actuators for snapping a respective one of the series installation devices onto a mounting device, wherein each of the slide actuators are coupled together by a coupling part having comb shape so that the plurality of snap-action slides are synchronously moveable by the slide actuators with respect to the series installation devices.

2. The device arrangement as claimed in claim 1, wherein the coupling part is retained on each of the corresponding slide actuators of the plurality of series installation devices.

3. The device arrangement as claimed in claim 2, wherein each of said corresponding slide actuators includes a blocking contour, which interacts with a snap-action element provided on a coupling web, and an abutment contour, which complements a supporting contour provided on a joining arm, wherein the joining arm, which is supported on the abutment contour via supporting contour thereof is fixed in position, and wherein the snap-action element engages behind the blocking contour.

4. The device arrangement as claimed in claim 3, wherein the abutment contour and the supporting contour are configured as a V and form centering angles ($\alpha_1$, $\alpha_2$), the centering angle $\alpha_1$ of the abutment contour being greater than the centering angle $\alpha_2$ of the supporting contour.

5. The device arrangement as claimed in claim 2, wherein a joining arm of the coupling part includes a cutting-edge contour at a free end, and on the corresponding slide actuators a membrane is provided which closes a joining space and which is severable by the cutting-edge contour.

6. The device arrangement as claimed in claim 2, wherein the cutting-edge contour is formed by two cutting-edge arms which flank an undercut contour on both sides.

7. The device arrangement as claimed in claim 2, wherein at least one slide actuator has a web form.

8. The device arrangement as claimed claim 2, wherein the coupling part includes a groove used as a handgrip.

9. The device arrangement as claimed in claim 1, wherein each of said corresponding slide actuators includes a blocking contour, which interacts with a snap-action element provided on a coupling web, and an abutment contour, which complements a supporting contour provided on a joining arm, wherein the joining arm, which is supported on the abutment contour via a supporting contour thereof is fixed in position, and wherein the snap-action element engages behind the blocking contour.

10. The device arrangement as claimed in claim 9, wherein the abutment contour and the supporting contour are configured as a V and form centering angles ($\alpha_1$, $\alpha_2$), the centering angle $\alpha_1$ of the abutment contour being greater than the centering angle $\alpha_2$ of the supporting contour.

11. The device arrangement as claimed in claim 9, wherein a transverse web is provided at a free end of the at least one joining arm and a stop is provided on at least one slide actuator, and wherein the transverse web engages behind the stop.

12. The device arrangement as claimed in claim 9, wherein the coupling part includes at least one clamping nose such that the coupling part is prestressed in relation to at least one slide actuator in a longitudinal direction and the at least one joining arm in a direction transverse to the longitudinal direction.

13. The device arrangement as claimed in claim 1, wherein a joining arm of the coupling part includes a cutting-edge contour at a free end, and on the corresponding slide actuators a membrane is provided which closes a joining space.

14. The device arrangement as claimed in claim 13, wherein the cutting-edge contour is formed by two cutting-edge arms which flank an undercut contour on both sides.

15. The device arrangement as claimed in claim 13, wherein a transverse web is provided at a free end of at least one joining arm and a stop is provided on at least one slide actuator, and wherein the transverse web engages behind the stop.

16. The device arrangement as claimed in claim 13, wherein the coupling part includes at least one clamping nose such that the coupling part is prestressed in relation to at least one slide actuator in a longitudinal direction of the at least one joining arm and transversely to the longitudinal direction.

17. The device arrangement as claimed in claim 1, wherein at least one slide actuator has a web form.

18. The device arrangement as claimed claim 1, wherein the coupling part includes a groove used as a handgrip.

19. The device arrangement as claimed in claim 1, wherein the coupling part includes a coupling web and a plurality of joining arms.

20. A method comprising:
   coupling a plurality of slide actuators together with a coupling part having a comb shape,
   the plurality of slide actuators corresponding to a respective plurality of snap-action slides of series installation devices; and
   actuating the plurality of snap-action slides synchronously based upon the snap-action slides being coupled together and being synchronously moveable.

21. The method of claim 20, wherein the coupling part includes a coupling web and a plurality of joining arms.

22. An apparatus comprising:
   means for coupling a plurality of slide actuators together, the means for coupling having a comb shape; and
   a plurality of attaching means, each corresponding to a respective one of the plurality of slide actuators, for attaching the coupled actuators to a mounting device, wherein the plurality of attaching means for attaching are adapted to be moved synchronously based upon the plurality of slide actuators being coupled together.

23. The apparatus of claim 22, wherein the means for coupling includes a coupling web and a plurality of joining arms.

* * * * *